United States Patent
Mano et al.

(10) Patent No.: US 7,205,361 B2
(45) Date of Patent: Apr. 17, 2007

(54) PARTICULATE HYDROPHOBIC POLYMER, PRODUCTION PROCESS THEREFOR AND COLUMN FOR REVERSED-PHASE HIGH-PERFORMANCE LIQUID CHROMATOGRAPHY

(75) Inventors: Keisuke Mano, Kanagawa (JP); Kuniaki Shimbo, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 305 days.

(21) Appl. No.: 10/491,144

(22) PCT Filed: Sep. 27, 2002

(86) PCT No.: PCT/JP02/10002

§ 371 (c)(1),
(2), (4) Date: Mar. 26, 2004

(87) PCT Pub. No.: WO03/029327

PCT Pub. Date: Apr. 10, 2003

(65) Prior Publication Data

US 2005/0043491 A1 Feb. 24, 2005

Related U.S. Application Data

(60) Provisional application No. 60/328,794, filed on Oct. 15, 2001.

(30) Foreign Application Priority Data

Sep. 28, 2001 (JP) ............................. 2001-302838

(51) Int. Cl.
*C08F 16/12* (2006.01)
*C08F 265/02* (2006.01)
(52) U.S. Cl. .................... 525/385; 525/329.7; 525/242; 525/328.9; 525/312; 525/304; 525/305; 525/308; 525/301
(58) Field of Classification Search ............. 525/329.7, 525/242, 385, 304, 305, 308, 301, 312, 328.9
See application file for complete search history.

(56) References Cited

U.S. PATENT DOCUMENTS 4,687,814 A 8/1987 Chaumont et al.

FOREIGN PATENT DOCUMENTS

| JP | 61-272654 A | | 12/1986 |
|---|---|---|---|
| JP | 62-267663 | * | 11/1987 |
| JP | 01-217035 | * | 8/1989 |
| JP | 4-58154 A | | 2/1992 |
| JP | 2000-9707 A | | 1/2000 |

OTHER PUBLICATIONS

Alvarez C. et al: "Preparation of New Synthetic Hydrogels Containing Galactose, Applicable in Affinity Chromatography" Journal of Applied Polymer Science, John Wiley and Sons Inc. New York, US, vol. 54, No. 12, Dec. 19, 1994, pp. 1887-1891 ISSN: 0021-8995.
Derwent Publications Ltd., London, GB; Class A28, AN 1989-295801 JP 01 214035 A (Hitachi Chem Co Ltd), Aug. 30, 1989.

* cited by examiner

*Primary Examiner*—Ling-Sui Choi
(74) *Attorney, Agent, or Firm*—Sughrue Mion, PLLC

(57) ABSTRACT

A particulate hydrophobic polymer produced by reacting (A) a particulate crosslinked polymer having a hydroxyl group with (B) a crosslinkable epoxy compound, hydrolyzing the epoxy bonds, and then reacting the obtained compound having a hydroxyl group with (C) an epoxy compound having from 6 to 40 carbon atoms in total, a production process therefor, a column for reversed-phase liquid chromatography, and an analysis method using the column.

By using the particulate hydrophobic polymer of the present invention having a remarkably high acid/alkali resistance, a sharp chromatogram for polycyclic aromatic compounds is obtainable with the swelling and shrinkage of the particulate polymer itself reduced and without reducing the column efficiency among various solvents even when the eluent in the column is variously exchanged.

20 Claims, No Drawings

PARTICULATE HYDROPHOBIC POLYMER, PRODUCTION PROCESS THEREFOR AND COLUMN FOR REVERSED-PHASE HIGH-PERFORMANCE LIQUID CHROMATOGRAPHY

CROSS-REFERENCE TO RELATED APPLICATIONS

This application is based on the provisions of 35 U.S.C. Article 111(a) with claiming the benefit of filing date of U.S. provisional application Ser. No. 60/328,794 filed on Oct. 15, 2001 under the provisions of 35 U.S.C. 111(b), pursuant to 35 U.S.C. Article 119(e)(1).

TECHNICAL FIELD

The present invention relates to a particulate hydrophobic polymer having excellent acid/alkali resistance, which is optimal as a packing material for reversed-phase liquid chromatography; a production process therefor; a column for reversed-phase liquid chromatography, packed with the particulate polymer; and an analysis method using the column.

BACKGROUND ART

As one separation system of liquid chromatography, a reversed-phase liquid chromatography is widely known, where the separation is performed based on the strength of retention differing due to difference in the hydrophobicity between the packing material and the substance to be separated.

Conventionally, a packing material obtained by introducing an octadecyl group into a silanol group of silica gel using a silane coupling agent having an octadecyl group (this packing material is hereinafter referred to as an "ODS") has been widely used as a packing material for reversed-phase liquid chromatography. This is because a fine particle having high mechanical strength can be produced relatively with ease.

However, silica gel is low in the alkali resistance and therefore, the usable eluent is limited to an eluent having a pH of 2 to 8. Furthermore, since it is actually impossible to chemically bond a coupling agent to all silanol groups, there arises a serious problem that a basic compound such as amine is readily adsorbed to an unreacted silanol group.

In recent years, various polymer-type packing materials for reversed-phase liquid chromatography have been developed so as to improve the handleability under alkali conditions, and some of them are commercially available as a column for reversed-phase liquid chromatography. Examples thereof include the followings:

(1) styrene-divinylbenzene copolymer particle ((see, Analytical Chemistry, Vol. 45, page 1383 (1973), commercially available product: Shodex (registered trademark of Showa Denko K.K.) RSpak RP18-413 produced by Showa Denko K.K.);

(2) methacrylate-type crosslinked polymer particle (commercially available product: Shodex (registered trademark of Showa Denko K.K.) RSpak DE-413 produced by Showa Denko K.K.);

(3) polyvinyl alcohol-type crosslinked polymer particle having chemically bonded thereto a long-chain acyl group (commercially available product: Shodex (registered trademark of Showa Denko K.K.) Asahipak (registered trademark of Showa Denko K.K.) ODP-40 4D produced by Showa Denko K.K.);

(4) methacrylic acid ester-type copolymer particle having a long-chain alkyl group (see, JP-A-2000-9707 (the term "JP-A" as used herein means an "unexamined published Japanese patent application"));

(5) copolymer particle of a glycidyl methacrylate and a (meth)acrylic acid ester of polyhydric alcohol, to which a long-chain alkyl group is chemically bonded (see, JP-A-61-272654); and (6) hydroxyl group-containing methacrylate-type crosslinked polymer particle having chemically bonded thereto a long-chain acyl group (see, JP-A-4-58154).

The columns for reversed-phase liquid chromatography, packed with these polymer-type particles, have some problems which are not negligible while such a column is advantageous in that the usable pH range is broader than that of the ODS column.

However, the columns packed with particulate polymers of (1) to (5) are not suitable for the separation and analysis of natural products or medical preparations having a polycyclic aromatic site, because the chromatogram of polycyclic aromatic compound is broad.

In the column packed with the particulate polymer of (1), the particulate polymer itself heavily swells or shrinks depending on the solvent and it is difficult to satisfactorily perform the separation and analysis by varying the eluent in the column.

The columns packed with the particulate polymers of (2) to (6) have a problem in that when the column is used at a pH of 2 or less or a pH of 11 or more for a long period of time, since the ester bond contained in its structure has a low resistance to acid/alkali, the column efficiency seriously decreases, the peak shape of a basic substance such as amine changes for the worse and the measurement cannot be continuously performed.

As a method for overcoming such a problem, it would be effective to produce an ether bond which has a high resistance to acid/alkali by reacting an epoxy compound with a particulate polymer having a hydroxyl group in introducing a functional group. As examples of the method, (A) a method of performing the reaction in water containing a base such as sodium hydroxide or in a polar organic solvent such as dimethylformamide, and (B) a method of performing the reaction in an ether-type solvent such as dioxane in the presence of a Lewis acid such as boron trifluoride diethyl ether complex (see, for example, JP-A-61-272654 mentioned in above (5)) are known. However, these methods have a problem in that the reaction takes a long time and since an epoxy compound is used in an excess amount, the after-treatment such as filtration is very cumbersome. Moreover, if the substrate gel is polyester-type gel as in the case where the above-mentioned material (5) is used, when the reaction of (A) or (B) is performed, the ester bond of the particulate polymer itself is cut by the hydrolysis and a carboxyl group comes out because the substrate gel is exposed to an acid or an alkali for a long period of time. The particulate polymer where a carboxyl group is present adsorbs a basic substance such as amine and therefore, is not suitable as a packing material for reversed-phase liquid chromatography.

A packing material capable of overcoming the above-described problems and a production process therefor are not known and establishment of these is urgently demanded.

DISCLOSURE OF THE INVENTION

The object of the present invention is to provide a packing material for reversed-phase liquid chromatography by a novel production process, which has remarkably high acid/alkali resistance, is reduced in the swelling and shrinkage of the particulate polymer itself, can maintain the column efficiency among various solvents even when the eluent in the column is variously exchanged, and gives a sharp chromatogram for polycyclic aromatic compounds.

As a result of extensive investigations to solve the above-described problems, the present inventors have newly found (1) that when the column used for reversed-phase liquid chromatography is packed with a particulate polymer obtained by reacting (A) a particulate crosslinked polymer having a hydroxyl group with (B) a crosslinkable epoxy compound, hydrolyzing the oxirane rings after coating the substrate and then reacting therewith (C) an epoxy compound having from 6 to 40 carbon atoms in total, remarkably high resistance against acid and alkali and against exchange of solvents can be attained and a sharp chromatogram can be obtained for polycyclic aromatic compounds, and (2) that when the reaction of the crosslinkable epoxy compound (B) and the epoxy compound (C) having from 6 to 40 carbon atoms in total is performed in the presence of a Lewis acid catalyst in a low polar solvent, the reaction proceeds very swiftly. The above-described object can be achieved by these findings.

More specifically, the present invention relates to the following matters.

(1) A particulate hydrophobic polymer produced by reacting (A) a particulate crosslinked polymer having a hydroxyl group with (B) a crosslinkable epoxy compound, hydrolyzing the oxirane rings, and then reacting the obtained compound having a hydroxyl group with (C) an epoxy compound having from 6 to 40 carbon atoms in total.

(2) The particulate hydrophobic polymer as described in (1) above, wherein the particulate crosslinked polymer (A) having a hydroxyl group is a copolymer of two or more members selected from the group consisting of (I) a poly(meth)acrylate of a polyhydric alcohol, having at least one hydroxyl group within the molecule, (II) a glycidyl (meth)acrylate and (III) a poly(meth)acrylate of a polyhydric alcohol, having no hydroxyl group within the molecule, or a homopolymer of the poly(meth)acrylate of a polyhydric alcohol (I).

(3) The particulate hydrophobic polymer as described in (2) above, wherein the poly(meth)acrylate of a polyhydric alcohol having at least one hydroxyl group within the molecule (I) is glycerol dimethacrylate, the glycidyl (meth)acrylate (II) is glycidyl methacrylate and the poly(meth)acrylate of a polyhydric alcohol having no hydroxyl group within the molecule (III) is alkylene glycol dimethacrylate.

(4) The particulate hydrophobic polymer as described in (3) above, wherein the alkylene glycol dimethacrylate is ethylene glycol dimethacrylate.

(5) The particulate hydrophobic polymer as described in (1) above, wherein the crosslinkable epoxy compound (B) is a compound selected from epihalohydrin and epoxy compounds containing two or more oxirane rings.

(6) The particulate hydrophobic polymer as described in (5) above, wherein the epoxy compound containing two or more oxirane rings is ethylene glycol diglycidyl ether, propylene glycol diglycidyl ether, butylene glycol diglycidyl ether, trimethylolpropane diglycidyl ether, trimethylolpropane triglycidyl ether, pentaerythritol triglycidyl ether or triglycidyl isocyanurate.

(7) The particulate hydrophobic polymer as described in (1) above, wherein the epoxy compound (C) having from 6 to 40 carbon atoms in total is a compound selected from the group consisting of the compounds represented by the following formulae (1) to (4):

(1)

(wherein n represents an integer of 4 to 38);

(2)

(wherein n represents an integer of 3 to 37);

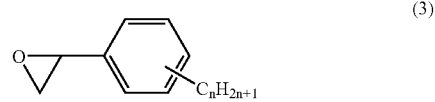

(3)

(wherein n represents an integer of 0 to 32);

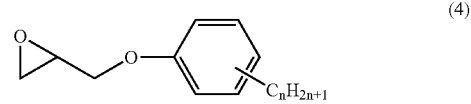

(4)

(wherein n represents an integer of 0 to 31).

(8) The particulate hydrophobic polymer as described in (7) above, wherein the epoxy compound (C) having from 6 to 40 carbon atoms in total is stearyl glycidyl ether.

(9) The particulate hydrophobic polymer as described in any one of (1) to (8) above, wherein the average particle size is from 1 to 2,000 μm.

(10) A production process for a particulate hydrophobic polymer, comprising reacting (A) a particulate crosslinked polymer having a hydroxyl group with (B) a crosslinkable epoxy compound, hydrolyzing the oxirane rings and then reacting therewith (C) an epoxy compound having from 6 to 40 carbon atoms in total.

(11) The production process for a particulate hydrophobic polymer as described in (10) above, wherein the particulate crosslinked polymer (A) having a hydroxyl group is a copolymer of two or more members selected from (I) a poly(meth)acrylate of a polyhydric alcohol, having at least one hydroxyl group within the molecule, (II) a glycidyl (meth)acrylate and (III) a poly(meth)acrylate of a polyhydric alcohol, having no hydroxyl group within the molecule, or a homopolymer of the poly(meth)acrylate of a polyhydric alcohol (I).

(12) The production process for a particulate hydrophobic polymer as described in (10) above, wherein the crosslinkable epoxy compound (B) is a compound selected from epihalohydrin and epoxy compounds containing two or more oxirane rings.

(13) The production process for a particulate hydrophobic polymer as described in (11) above, wherein the poly(meth)acrylate of a polyhydric alcohol having at least one hydroxyl group within the molecule (I) is glycerol dimethacrylate, the glycidyl(meth)acrylate (II) is glycidyl methacrylate and the poly(meth)acrylate of a polyhydric alcohol having no hydroxyl group within the molecule (III) is alkylene glycol dimethacrylate.

(14) The production process for a particulate hydrophobic polymer as described in (13) above, wherein the alkylene glycol dimethacrylate is ethylene glycol dimethacrylate.

(15) The production process for a particulate hydrophobic polymer as described in (12) above, wherein the epoxy compound containing two or more oxirane rings is ethylene glycol diglycidyl ether, propylene glycol diglycidyl ether, butylene glycol diglycidyl ether, trimethylolpropane diglycidyl ether, trimethylolpropane triglycidyl ether, pentaerythritol triglycidyl ether or triglycidyl isocyanurate.

(16) The production process for a particulate hydrophobic polymer as described in (10) above, wherein the epoxy compound (C) having from 6 to 40 carbon atoms in total is a compound selected from the compounds represented by the following formulae (1) to (4) described in (7) above.

(17) The production process for a particulate hydrophobic polymer as described in (16) above, wherein the epoxy compound (C) having from 6 to 40 carbon atoms in total is stearyl glycidyl ether.

(18) The production process for a particulate hydrophobic polymer as described in (10) above, wherein the reaction between the particulate crosslinked polymer (A) having a hydroxyl group and the epoxy compound containing two or more oxirane rings is performed in the presence of a Lewis acid in a low polar solvent.

(19) The production process for a particulate hydrophobic polymer as described in (10) above, wherein the reaction with the epoxy compound (C) having from 6 to 40 carbon atoms in total is performed in the presence of a Lewis acid in a low polar solvent.

(20) The production process for a particulate hydrophobic polymer as described in (18) or (19) above, wherein the low polar solvent is a hydrocarbon having from 5 to 10 carbon atoms in total.

(21) The production process for a particulate hydrophobic polymer as described in (18) or (19) above, wherein the concentration of the Lewis acid is from 1 to 70 mass % based on the particulate crosslinked polymer.

(22) The production process for a particulate hydrophobic polymer as described in any one of (10) to (21) above, wherein the average particle size of the particulate hydrophobic polymer is from 1 to 2,000 μm.

(23) A column for reversed-phase liquid chromatography, packed with the particulate hydrophobic polymer as described in any one of (1) to (9) above.

(24) A method for analyzing a sample containing a polycyclic aromatic compound, comprising using the column for reversed-phase liquid chromatography as described in (23) above.

DETAILED DESCRIPTION OF THE INVENTION

The present invention relates to a particulate hydrophobic polymer having excellent acid/alkali resistance, which is optimal as a packing material for reversed-phase liquid chromatography; a production process therefor; a column for reversed-phase liquid chromatography, packed with the particulate polymer; and an analysis method using the column.

Examples of the poly(meth)acrylate (I) of a polyhydric alcohol having at least one hydroxyl group within the molecule for use in the present invention include glycerol diacrylate, glycerol dimethacrylate, pentaerythritol triacrylate, pentaerythritol diacrylate, pentaerythritol trimethacrylate, pentaerythritol dimethacrylate, trimethylolpropane diacrylate and trimethylolpropane dimethacrylate. Among these, glycerol diacrylate and glycerol dimethacrylate are preferred in view of easy availability and profitability. Those compounds may be used individually or in combination of two or more thereof.

The glycidyl (meth)acrylate (II) is preferably glycidyl methacrylate in view of the chemical strength of the particulate crosslinked polymer produced.

Examples of the poly(meth)acrylate (III) of a polyhydric alcohol having no hydroxyl group within the molecule include a (meth)acrylate of polyalkylene glycol such as ethylene glycol di(meth)acrylate, diethylene glycol di(meth)acrylate, propylene glycol di(meth)acrylate, polyethylene glycol di(meth)acrylate and polypropylene glycol di(meth)acrylat; glycerol tri(meth)acrylate; and trimethylolpropane tri(meth)acrylate. Among these, ethylene glycol dimethacrylate is preferred in view of easy availability and profitability. Those compounds may be used individually or in combination of two or more thereof.

In the present invention, for reaction of a particulate crosslinked polymer having a hydroxyl group with (B) a crosslinkable epoxy compound, a particulate homopolymer of a poly(meth)acrylate (I) of a polyhydric alcohol having at least one hydroxyl group within the molecule or a particulate copolymer of a poly(meth)acrylate (I) of a polyhydric alcohol and a poly(meth)acrylate (III) of a polyhydric alcohol having no hydroxyl group within the molecule may be used as is to react with an epoxy compound as later described. Alternatively, after copoymerizing poly(meth)acrylate (I) of a polyhydric alcohol and glycidyl (meth)acrylate (II), glycidyl (meth)acrylate (II) and poly(meth)acrylate (III) of a polyhydric alcohol having no hydroxyl group within the molecule, or poly(meth)acrylate (I), glycidyl (meth)acrylate (II) and poly(meth)acrylate (III) of a polyhydric alcohol having no hydroxyl group within the molecule, the oxirane rings in the copolymer may be hydrolyzed and then reaction with a crosslinkable epoxy compound as later described may be performed.

In the production of the copolymer of poly(meth)acrylate (I) of a polyhydric alcohol and poly(meth)acrylate(III) of a polyhydric alcohol having no hydroxyl group within the molecule, (I) is preferably used in 10 mass % or more, more preferably in 20 mass % or more. If the ratio of (I) is less than 10 mass %, the particulate polymer obtained after the reaction with an epoxy compound (C) having from 6 to 40 carbon atoms in total is poor in the separation performance as a packing material for reversed-phase liquid chromatography, in particular, the peak of polycyclic aromatic compound becomes broad.

In the production of the copolymer of poly(meth)acrylate (I) of polyhydric alcohol and glycidyl (meth)acrylate (II), (I) is preferably used in 30 mass % or more, more preferably in 50 mass % or more. If the ratio of (I) is less than 30 mass %, the particulate polymer obtained is reduced in the mechanical strength.

In the production of the copolymer of glycidyl (meth)acrylate (II) and poly(meth)acrylate (III) of a polyhydric alcohol having no hydroxyl group within the molecule, (III)

is preferably used in the range of 30 to 90 mass %, more preferably from 50 to 80 mass %. If the ratio of (III) is less than 30 mass %, the particulate polymer obtained is reduced in the mechanical strength, whereas if it exceeds 90 mass %, the particulate polymer obtained after the reaction with an epoxy compound (C) having from 6 to 40 carbon atoms in total is poor in the separation performance as a packing material for reversed-phase liquid chromatography and the peak of polycyclic aromatic compound becomes broad.

In the production of the copolymer of poly(meth)acrylate (I) of polyhydric alcohol, glycidyl (meth)acrylate (II) and poly(meth)acrylate(III) of a polyhydric alcohol having no hydroxyl group within the molecule, the total ratio of (I) and (III) used are preferably 30 mass % or more, more preferably 50 or more. If the total ratio of (I) and (III) is less than 30 mass %, the particulate polymer obtained is reduced in the mechanical strength. At the same time, (I) and (II) are preferably used in total in 10 mass % or more, more preferably in 20 mass % or more. If the total of (I) and (II) is less than 10 mass %, the particulate polymer obtained after the reaction with an epoxy compound (C) having from 6 to 40 carbon atoms in total is poor in the separation performance as a packing material for reversed-phase liquid chromatography and the peak of polycyclic aromatic compound becomes broad.

In the present invention, the poly(meth)acrylate (I) of a polyhydric alcohol, having at least one hydroxyl group within the molecule, the glycidyl (meth)acrylate (II) and the poly(meth)acrylate (III) of a polyhydric alcohol having no hydroxyl group within the molecule, may be subjected to aqueous suspension polymerization in the presence of an organic solvent incompatible with water to form a particulate crosslinked (co)polymer (hereinafter, (I), (II) and (III) each is referred to as a "monomer").

The organic solvent incompatible with water for use in the present invention is not particularly limited. However, as the organic solvent used has higher affinity for the monomer, the particulate crosslinked (co)polymer is more reduced in the pore size and more elevated in the physical strength. In this respect, an organic solvent mainly comprising an alcohol having from 5 to 12 carbon atoms, such as isoamyl alcohol, 1-hexanol, 1-octanol, 2-ethylhexanol, 1-decanol and 1-dodecanol, is preferred. These organic solvents may be used individually or in combination of two or more thereof.

The organic solvent may be used in the range of 10 to 300 mass % based on the total amount of monomers (I), (II) and (III) but is preferably used in the range of 25 to 100 mass % in view of the specific surface area and the physical strength of the particulate crosslinked (co) polymer.

Examples of the polymerization initiator suitable for use in the present invention include organic peroxides such as benzoyl peroxide, dichlorobenzoyl peroxide, dicumyl peroxide and lauroyl peroxide, and azo-type compounds such as 2,2'-azobis(isobutyronitrile) and 2,2'-azobis (2,4-dimethylvaleronitrile). These compounds may be used individually or in combination of two or more thereof. Among these, azo-type polymerization initiators are preferred in view of easy handleability.

The polymerization initiator is used in the range of 0.1 to 4 mass %, preferably from 1 to 2 mass %, based on the total amount of monomers. If the amount of the polymerization initiator is less than 0.1 mass %, a very long time is necessary for completing the polymerization, whereas if it exceeds 4 mass %, the polymerization proceeds at a high rate and this is not preferred in view of safety.

In the present invention, a dispersant such as sparingly soluble phosphate or water-soluble polymer compound can be added to the aqueous phase. Examples of the sparingly soluble phosphate include calcium phosphate(tribasic) and magnesium phosphate. Examples of the water-soluble polymer compound include polyvinyl alcohol, alkylcellulose, hydroxyalkylcellulose and carboxyalkylcellulose.

The dispersant may be a sparingly soluble phosphate or a water-soluble polymer compound, however, a water-soluble polymer compound is preferred because this compound can be removed by washing under neutral conditions. The water-soluble polymer compound is preferably used in the range of 0.01 to 3 mass % based on water.

In addition, a water-soluble inorganic salt may be added to the aqueous phase for the purpose of reducing the solubility in water of the monomers or the organic solvent incompatible with water. Examples of the water-soluble inorganic salt include sodium chloride, calcium chloride and sodium sulfate. These water-soluble inorganic salts may be used individually or in combination of two or more thereof. The concentration of the salt used is not particularly limited but, for example, sodium chloride is preferably used in the range of 0.5 to 15 mass % based on water used.

The poly(meth)acrylate (I) of a polyhydric alcohol having at least one hydroxyl group within the molecule, the glycidyl (meth)acrylate (II), the poly(meth)acrylate (III) of a polyhydric alcohol having no hydroxyl group within the molecule, and the polymerization initiator are previously mixed and the mixture is added to and dispersed in an aqueous solution containing the water-soluble inorganic salt. In this case, a disperser such as homomixer can be used according to the objective particle size.

The amount of water used is preferably from 1 to 50 times by mass based on the total amount of the monomers and the organic solvent, however, on taking account of the stability of dispersion solution or the time necessary for filtration in the later step, water is suitably used in the range of 2 to 10 times by mass.

In the case where the monomer (II) is used, the glycidyl group of the particulate crosslinked (co)polymer obtained is hydrolyzed with an acid. Examples of the acid catalyst include a sulfuric acid, a perchloric acid, a hydrochloric acid, a toluenesulfonic acid and a benzenesulfonic acid. Among these, a hydrochloric acid is preferred in view of easy handleability.

The concentration of the acid used is preferably from 0.01 to 5 N, more preferably from 0.05 to 2 N. If the concentration is less than 0.01 N, the reaction does not proceed swiftly, whereas if it exceeds 5 N, hydrolysis of the ester bond is liable to occur. At the time of performing this reaction, as long as at least 10 mass % or more of water is contained in the solvent, an organic solvent may be used in combination. The organic solvent used is not particularly limited as long as it is compatible with both an acid and water and inactive to an acid and a glycidyl group. Examples thereof include acetone, methyl ethyl ketone, 1,4-dioxane and tetrahydrofuran.

The amount of the acid solution used may be sufficient if it is large enough to immerse the particulate crosslinked polymer in the solvent, for example, it may be equal to or greater than the gel mass. The reaction conditions cannot be indiscriminately specified, however, the reaction is preferably performed at 25 to 100° C. for 3 to 10 hours.

The thus-obtained particulate crosslinked (co)polymer is subjected to surface crosslinking with a crosslinkable epoxy compound (B). This operation is necessary in order to impart sufficiently high mechanical strength and extremely high acid/alkali resistance to the particulate polymer.

Examples of the crosslinkable epoxy compound (B) include a compound selected from the group consisting of epihalohydrin and epoxy compounds having two or more oxirane rings. Examples of epihalohydrin include epichlorohydrin, epibromohydrin and epiiodohydrin. Examples of epoxy compound having two or more oxirane rings include ethylene glycol diglycidyl ether, propylene glycol diglycidyl ether, butylene glycol diglycidyl ether, trimethylolpropane diglycidyl ether, trimethylolpropane triglycidyl ether, pentaerythritol triglycidyl ether and triglycidyl isocyanurate. Those compounds may be used individually or in combination of two or more thereof. Among these, epichlorohydrin or ethylene glycol diglycidyl ether is preferred in view of the balance between the strength attained and the profitability.

In the case of performing the surface-crosslinking reaction using epihalohydrin as the crosslinkable epoxy compound (B), the reaction proceeds while releasing or eliminating a halogen atom and therefore, the reaction is performed in the presence of an alkali aqueous solution. Examples of the alkali which is usually used include a hydroxide and a carbonate of an alkali metal, and a hydroxide and a carbonate of an alkaline earth metal. This reaction may also be performed in a mixed solvent of water and a polar organic solvent such as dimethylformamide, N-methylpyrrolidone and dimethylsulfoxide.

The amount of the epihalohydrin used is preferably from 5 to 200 mass %, more preferably from 50 to 150 mass %, based on the particulate crosslinked polymer. If the amount of epihalohydrin used is less than 5 mass %, the surface-crosslinking reaction proceeds at a low rate and takes a very long time, whereas if it exceeds 200 mass %, the after-treatment after the reaction is very cumbersome.

The concentration of the alkali aqueous solution used is preferably from 5 to 40 mass % and in view of easy production, more preferably from 10 to 30 mass %. The amount of the alkali aqueous solution may be sufficient if it is large enough to dip the particulate polymer in the solvent, for example, it may be 2 times or more the gel mass. At the time of performing the reaction by adding a polar organic solvent such as dimethylformamide, N-methylpyrrolidone or dimethylsulfoxide, the polar organic solvent is added to a system where an alkali aqueous solution is added in an amount of two times or more the gel mass.

The amount of the polar organic solvent added is not particularly limited but may be added in an amount of 0.1 to 2 times of the alkali aqueous solution. The reaction is preferably performed at a temperature of 25 to 100° C. for 3 to 16 hours, more preferably at 30 to 60° C., for 5 to 12 hours.

In the case of using an epoxy compound having two or more oxirane rings as the crosslinkable epoxy compound (B), the surface-crosslinking reaction can be performed under either alkaline condition or acidic condition. At the time of performing the surface-crosslinking reaction under alkaline condition, the reaction conditions may be utterly the same as in the case of using epihalohydrin as the crosslinkable epoxy compound (B).

On the other hand, as for the method of performing the surface-crosslinking reaction under acidic condition, a method of performing the reaction in the presence of a Lewis acid as a catalyst may be used. The Lewis acid is not particularly limited but examples thereof include tin tetrachloride, titanium tetrachloride and an ether complex of boron trifluoride. These compounds may be used in combination of two or more thereof. Among these, an ether complex of boron trifluoride is most preferred in view of easy handleability.

Examples of the solvent used at the time of performing the surface crosslinking include a hydrocarbon-type solvent having from 5 to 18 carbon atoms, such as benzene, toluene, o-xylene, m-xylene, p-xylene, mesitylene, ethylbenzene, propylbenzene, cumene, butylbenzene, isobutylbenzene, amylbenzene, isoamylbenzene, pentane, hexane, cyclohexane, cyclopentane, decalin, heptane, octane, isooctane, n-nonane, n-decane, n-undecane, n-dodecane, n-tridecane, n-tetradecane, n-hexadecane and n-octadecane; an ether-type solvent such as anisole, ethylisoamyl ether, ethyl-t-butyl ether, diisoamyl ether, diisopropyl ether, diphenyl ether, dibutyl ether, dipropyl ether, dibenzyl ether, tetrahydrofuran, methyl-t-butyl ether, 1,4-dioxane, diethylene glycol diethyl ether and triethylene glycol dimethyl; and a halogenated hydrocarbon such as chloroform, carbon tetrachloride, dichloromethane, 1,1-dichloroethane, 1,2-dichloroethane, chlorobenzene, o-chlorotoluene, p-chlorotoluene, o-dichlorobenzene, m-dichlorobenzene, p-dichlorobenzene, dibromoethane, dibromobutane, dibromopropane and dibromobenzene.

On taking account of profitability, easy handleability and the like, a hydrocarbon-type solvent or an ether-type solvent is preferred. In view of the reaction speed, a hydrocarbon-type solvent having from 6 to 10 carbon atoms in total, such as benzene, toluene, o-xylene, m-xylene, p-xylene, mesitylene, ethylbenzene, hexane, octane, isooctane, n-nonane and n-decane, is more preferred.

The amount of the crosslinkable epoxy compound (B) used is preferably in the range of 0.1 to 100 mass %, more preferably from 0.5 to 50 mass %, based on the particulate crosslinked (co)polymer. If the amount used is less than 0.1 mass %, the effect of surface crosslinking is not brought out and the acid/alkali resistance decreases, whereas if it exceeds 100 mass %, the after-treatment after the reaction is very cumbersome.

The amount of the solvent used may be sufficient if it is large enough to immerse the particulate crosslinked polymer in the solvent, for example, it may be 2 times or more the mass of the particulate crosslinked polymer. In view of easy handleability, the amount of the solvent used is preferably from 3 to 10 times, more preferably from 4 to 7 times, the mass of the particulate crosslinked polymer.

The concentration of the Lewis acid used as a catalyst may be from 0.1 to 100 mass % based on the crosslinkable epoxy compound (B), however, in view of the reaction rate and the profitability, the concentration is preferably from 1 to 70 mass %. The reaction is preferably performed at a temperature of 10 to 100° C. for 1 to 16 hours, more preferably at 20 to 60° C. for 2 to 10 hours.

Subsequently, the epoxy group of the particulate surface-crosslinked polymer obtained is hydrolyzed with an acid. Examples of the acid catalyst include a sulfuric acid, a perchloric acid, a hydrochloric acid, a toluene sulfonic acid and a benzenesulfonic acid. Among these, a hydrochloric acid is preferred in view of easy handleability.

The concentration of the acid used is preferably from 0.01 to 5 N, more preferably from 0.05 to 2 N. If the concentration is less than 0.01 N, the reaction does not proceed swiftly, whereas if it exceeds 5 N, hydrolysis of the ester bond is liable to occur. At this time, as long as at least 10 mass % or more of water is contained as the solvent, an organic solvent may be used in combination.

The organic solvent used is not particularly limited as long as it is compatible with both an acid and water and inactive to an acid and an oxirane ring. Examples thereof include acetone, methyl ethyl ketone, 1,4-dioxane and tetrahydrofuran.

The thus-obtained particulate epoxy ring-opening surface-crosslinked (co)polymer is reacted with an epoxy compound (C) having from 6 to 40 carbon atoms in total to obtain a particulate hydrophobic polymer.

Examples of the epoxy compound (C) having from 6 to 40 carbon atoms in total include the compounds represented by formulae (1) to (4). In view of easy availability, the epoxy compounds represented by formula (1) or (2) and having from 6 to 22 carbon atoms in total are preferred, and the compounds having from 8 to 18 carbon atoms in total are more preferred.

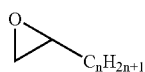

(1)

(wherein n represents an integer of 4 to 38);

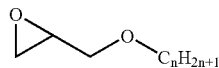

(2)

(wherein n represents an integer of 3 to 37);

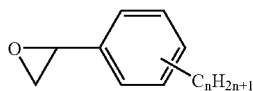

(3)

(wherein n represents an integer of 0 to 32);

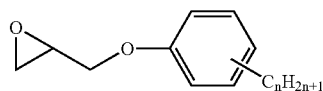

(4)

(wherein n represents an integer of 0 to 31)

The reaction of the epoxy compound and the particulate epoxy ring-opening surface-crosslinked (co)polymer can be performed under either alkaline condition or acidic condition, however, in view of the reaction rate and the reaction reproducibility, the reaction is preferably performed under acidic condition. A representative example thereof is a method of performing the reaction in the presence of a Lewis acid as a catalyst. Examples of the Lewis acid used therein include tin tetrachloride, titanium tetrachloride and an ether complex of boron trifluoride. The Lewis acid used is not particularly limited and two or more Lewis acids may be used in combination. In view of easy availability, an ether complex of boron trifluoride is preferred.

Examples of the solvent used at the reaction of the epoxy compound (C) having from 6 to 40 carbon atoms in total and the particulate epoxy ring-opening surface-crosslinked polymer include a hydrocarbon-type solvent having from 5 to 18 carbon atoms, such as benzene, toluene, o-xylene, m-xylene, p-xylene, mesitylene, ethylbenzene, propylbenzene, cumene, butylbenzene, isobutylbenzene, amylbenzene, isoamylbenzene, pentane, hexane, cyclohexane, cyclopentane, decalin, heptane, octane, isooctane, n-nonane, n-decane, n-undecane, n-dodecane, n-tridecane, n-tetradecane, n-hexadecane and n-octadecane; an ether-type solvent such as anisole, ethylisoamyl ether, ethyl-t-butyl ether, diisoamyl ether, diisopropyl ether, diphenyl ether, dibutyl ether, dipropyl ether, dibenzyl ether, tetrahydrofuran, methyl-t-butyl ether, 1,4-dioxane, diethylene glycol diethyl ether and triethylene glycol dimethyl; and a halogenated hydrocarbon such as chloroform, carbon tetrachloride, dichloromethane, 1,1-dichloroethane, 1,2-dichloroethane, chlorobenzene, o-chlorotoluene, p-chlorotoluene, o-dichlorobenzene, m-dichlorobenzene, p-dichlorobenzene, dibromoethane, dibromobutane, dibromopropane and dibromobenzene.

On taking account of profitability, easy handleability and the like, a hydrocarbon-type solvent or an ether-type solvent is preferred. In view of reaction rate, a hydrocarbon-type solvent having from 6 to 10 carbon atoms in total, such as benzene, toluene, o-xylene, m-xylene, p-xylene, mesitylene, ethylbenzene, hexane, octane, isooctane, n-nonane and n-decane, is more preferred.

The epoxy compound (C) may be used individually or in combination of two or more thereof.

The amount of the epoxy compound (C) used is preferably from 10 to 2,000 mass %, more preferably from 100 to 1,000 mass %, based on the crosslinkable epoxy compound (B). If the amount used is less than 10 mass %, the reaction reproducibility becomes poor, whereas if it exceeds 2,000 mass %, washing in the later step is cumbersome.

The amount of the solvent used may be sufficient if it is large enough to dip the particulate crosslinked polymers in the solvent, for example, it may be 2 times or more the mass of the particulate crosslinked polymer. In view of easy handleability, the amount used is preferably from 3 to 10 times, more preferably from 4 to 7 times.

The concentration of the Lewis acid used as a catalyst may be from 0.1 to 100 mass % based on the crosslinkable epoxy compound (B), however, in view of reaction rate and profitability, the concentration is preferably from 1 to 70 mass %. The reaction is preferably performed at a temperature of 10 to 100° C. for 1 to 16 hours, more preferably at 20 to 60° C. for 2 to 10 hours.

The thus-obtained spherical particles having a particle size of 1 to 2,000 μm, preferably from 3 to 25 μm, are classified, if desired, and then can be used as a packing material for reversed-phase liquid chromatography. Examples of the eluent include water/acetonitrile, water/methanol, acetonitrile/(acid or alkali aqueous solution) and methanol/(acid or alkali aqueous solution).

The column packed with the packing material of the present invention is satisfactorily suppressed in the swelling/shrinkage depending on the solvent, can be used at a pH of 1 to 13 and exhibits excellent acid/alkali resistance. Furthermore, the ratio of the theoretical plate number of pyrene to the theoretical plate number of naphthalene is 0.7 or more and a sharp peak can be obtained for polycyclic aromatic compounds.

BEST MODE FOR CARRYING OUT THE INVENTION

The present invention is described in greater detail below by referring to Examples, however, the present invention is not limited to these Examples.

EXAMPLE 1

<Step 1: Synthesis of Substrate Particulate Crosslinked Polymer>

In a mixed solution containing 2,000 g of glycerol dimethacrylate and 1,000 g of 1-hexanol, 30 g of 2,2'-azobis (isobutyronitrile) was dissolved to prepare an oil phase. Separately, 120 g of polyvinyl alcohol (Kuraray Poval PVA-224, produced by Kuraray Co., Ltd.) was dissolved in 3 liter of water and thereto, 7 liter of water and subsequently an aqueous solution (2 liter) containing 240 g of sodium chloride were added and mixed to prepare an aqueous phase. The thus-obtained oil phase and aqueous phase were mixed in a 20 L-volume stainless steel-made container and the mixture was dispersed in a high-speed disperser (homogenizer) while controlling the rotation number and the dispersion time to obtain oil droplets having a maximum particle size of 4 μm.

Thereafter, the dispersion was stirred at 150 rpm to allow a reaction to proceed at 60° C. for 7 hours. The produced particulate crosslinked polymer was centrifuged (at 2,000 rpm for 10 minutes), the supernatant was discarded, the precipitate was dispersed in 12 liter of hot water at 70° C. (using an ultrasonic washer), and the dispersion was stirred at 70° C. for 3 hours and then filtered by suction. The cake on the funnel was washed with 60 liter of hot water at 70° C. and subsequently with 18 liter of acetone, air-dried by spreading the cake on a stainless steel-made vat, and further dried under reduced pressure at 60° C. for 24 hours. The particles were classified by a pneumatic classifier to obtain 620 g of a particulate crosslinked polymer having an average particle size of 4 μm (hereinafter referred to as a "substrate gel").

<Step 2: Thorough Washing>

To 50 g of the substrate gel obtained in the step 1, 500 ml of pure water was added. The resulting mixture was stirred under heating at 60° C. for 5 hours and then the particles were collected by filtration, washed in sequence with 2,000 ml of hot water at 70° C. and with 300 ml of methanol, air-dried by spreading the particles on a stainless steel-made vat and further dried under reduced pressure at 70° C. for 24 hours to obtain 48 g of a thoroughly washed substrate gel.

<Step 3: Surface Crosslinking>

In 100 ml of toluene, 20 g of the thoroughly washed substrate gel obtained in the step 2 was dispersed. After adding thereto 2 g of ethylene glycol diglycidyl ether while stirring, the mixture was stirred at room temperature for 30 minutes and thereto, a solution obtained by dissolving 500 mg of boron trifluoride diethyl ether complex in 5 ml of toluene was added dropwise and reacted at 40° C. for 3 hours.

Insoluble matters were collected by filtration and washed in sequence with 100 ml of toluene and with 100 ml of tetrahydrofuran. Then, the particulate polymer was collected by filtration and transferred to a 300 mL-volume beaker. After adding thereto 100 mL of tetrahydrofuran, the mixture was subjected to an ultrasonic wave treatment for 10 minutes by an ultrasonic washer. The particulate polymer was again collected by filtration and then, washed in sequence with 100 ml of tetrahydrofuran and with 100 ml of acetone, air-dried and further dried under reduced pressure at 60° C. for 2 hour (yield: 21.2 g).

<Step 4: Epoxy Ring-Opening Reaction>

In 60 ml of an aqueous 0.05 N hydrochloric acid solution, 15 g of the particulate surface-crosslinked polymer obtained in the step 3 was dispersed and stirred at 50° C. for 1 hour. The obtained particulate epoxy ring-opening polymer was collected by filtration, washed with 500 ml of pure water, air-dried and further dried under reduced pressure at 60° C. for 2 hours (yield: 15.5 g) Hereinafter, the particulate epoxy ring-opening polymer thus obtained was referred to as an "unmodified gel".

<Step 5: C18-Introducing Reaction>

In 100 ml of toluene, 15 g of the unmodified gel obtained in the step 4 was dispersed. After adding thereto 105 g of stearyl glycidyl ether, the mixture was stirred at 40° C. for 0.5 hour and thereto, a solution obtained by dissolving 1 g of boron trifluoride diethyl ether complex in 5 ml of toluene was added and reacted at 40° C. for 5 hours. Then, 100 ml of toluene was added to the reactor, the particulate polymer was collected by filtration, washed with 200 ml of tetrahydrofuran and then transferred to a 300 ml-volume beaker. After adding thereto 100 ml of tetrahydrofuran, the mixture was subjected to an ultrasonic wave treatment for 10 minutes by an ultrasonic washer and the particulate polymer was again collected by filtration.

The particulate polymer was washed with 100 ml of tetrahydrofuran, again transferred to a 300 ml-volume beaker, and dispersed in denatured alcohol/aqueous 1% dipotassium hydrogenphosphate solution (50/50 (v/v)). The obtained dispersion was subjected to an ultrasonic wave treatment for 10 minutes by an ultrasonic washer and the particulate polymer was again collected by filtration. The collected particulate polymer was washed with 500 ml of pure water and with 200 ml of acetone, air-dried and further dried under reduced pressure at 60° C. for 2 hours (C18-introduced particulate crosslinked polymer: hereinafter referred to as a "modified gel"; yield: 17.5 g).

<Introduction Ratio of C18 Group>

From respective elementary analysis values of the unmodified gel and the modified gel, the introduction ratio of the C18 group was calculated and found to be 20 mass %.

<Packing of Modified Gel>

The modified gel obtained in the step 5 was packed into a stainless steel-made column of 4.6 mm (inside diameter)× 150 mm (length) by a slurry method to manufacture a column for reversed-phase liquid chromatography (hereinafter referred to as "Column A").

<Capability Measurement 1: Ratio of Theoretical Plate Numbers of Naphthalene and Pyrene>

Column A was measured on the theoretical plate number for peaks of naphthalene and pyrene under the following reversed-phase liquid chromatography measuring conditions.

Reverse Phase Liquid Chromatography Measuring Conditions:

Eluent: $CH_3CN$/water=65/35 (v/v)

Flow rate: 1.00 ml/min

Column temperature: 40° C.

Detector: UV 254 nm

Samples: naphthalene (0.4 mg/ml)

pyrene (0.3 mg/ml)

Injection volume: 5 μl

As a result, the following values were obtained as the theoretical plate number for each peak. In the parentheses, a ratio to the value of naphthalene taken as 1 is shown.

Naphthalene: 7,300 (1.00), pyrene: 6,200 (0.85).

<Capability Measurement 2: Acid Resistance Test>

Column A was tested on the acid resistance under the following conditions.

Eluent: MeOH/aqueous 1% trifluoroacetic acid solution (pH 1.2)=10/90 (v/v)
Flow rate: 1.00 ml/min
Column temperature: 60° C.
Detector: UV 254 nm
Samples: p-hydroxybenzoic acid (0.5 mg/ml)
Injection volume: 10 µl
Test time: 70 hours As a result, the following values were obtained as the retention time of p-hydroxybenzoic acid. In the parentheses, a ratio to the retention time of p-hydroxybenzoic acid immediately after the initiation, taken as 1, is shown. Immediately after initiation of test: 12.6 min (1.00), after 70 hours from the initiation of test: 12.3 min (0.98).

<Capability Measurement 3: Alkali Resistance Test>

Column A was tested on the alkali resistance under the following conditions and the retention time of pyrene measured under the same conditions as in Capability Measurement 1 was compared before and after the test.

Eluent: $CH_3CN$/0.1 N-NaOH (pH 13)=20/80 (v/v)
Flow rate: 0.50 ml/min
Column temperature: 25° C.
Test Time: 18 hours As a result, the following values were obtained as the retention time of pyrene. In the parentheses, a ratio to the value before the test taken as 1 is shown. Before alkali resistance test: 11.6 min (1.00), after passing of 18 hours in alkali resistance test: 11.6 min (1.00).

<Capability Measurement 4: Solvent Exchange Test>

Column A was tested on the solvent exchange under the following conditions and each theoretical plate number of naphthalene and pyrene measured under the same conditions as in Capability Measurement 1 was compared before and after the test. Pure water and methanol were exchanged every 60 minutes at a flow rate of 0.5 ml/min and 5 cycles were repeated for each sample.

As a result, the following value was obtained as the theoretical plate number for each peak. In the parentheses, a value before performing the solvent exchange test and a ratio of the plate number before the test to the plate number after the test are shown. Naphthalene: 7,300 (7,300, 1.00), pyrene: 6,200 (6,200, 1.00).

Comparative Example 1

<Step 1: Synthesis of Substrate Particulate Crosslinked Polymer>

A substrate particulate crosslinked polymer (hereinafter, simply referred to as a "substrate gel") was obtained in the same operation as in Example 1.

<Step 2: Thorough Washing>

A thoroughly washed substrate gel was obtained in the same operation as in Example 1.

<Step 3: Surface Crosslinking>

20 g of the thoroughly washed substrate gel obtained in step 2 was mixed with 20 g of ethylene glycol diglycidyl ether, and the mixture was stirred at room temperature for 30 minutes. Then, 50 g of 1N-NaOH was added thereto and stirred at 30° C. for 3 hours.

After collected by filtration, the insoluble matters were washed with 1000 ml of pure water, and then with 100 ml of acetone, and dried under reduced pressure at 60° C. for 2 hours. (yield: 20.7 g).

<Step 4: Epoxy Ring-Opening Reaction> and

<Step 5: C18-Introducing Reaction>

C18-introduced particulate crosslinked polymer (hereinafter, referred to as a "modified gel") was obtained by the same operation as in Example 1. (yield: 18.1 g)

<Introduction Ratio of C18 Group>

From respective elementary analysis values of the unmodified gel and the modified gel, the introduction ratio of C18 group was calculated and found to be 19 mass %.

<Packing of Modified Gel>

The packing was performed by the same operation as in Example 1 (hereinafter referred to as "Column B").

<Capability Measurement 1: Ratio of Theoretical Plate Numbers of Naphthalene and Pyrene>

Column B was tested under the same conditions as in Example 1.

As a result, the following values were obtained as the theoretical plate number for each peak. In the parentheses, a ratio to the value of naphthalene taken as 1 is shown. Naphthalene: 6,900 (1.00), pyrene: 5,800 (0.84).

<Capability Measurement 2: Acid Resistance Test>

Column B was tested under the same conditions as in Example 1.

As a result, the following values were obtained as the retention time of p-hydroxybenzoic acid. In the parentheses, a ratio to the retention time of p-hydroxybenzoic acid immediately after the initiation, taken as 1, is shown. Immediately after initiation of test: 11.4 min (1.00), after 70 hours from the initiation of test: 10.8 min (0.95).

<Capability Measurement 3: Alkali Resistance Test>

Column B was tested under the same conditions as in Example 1.

As a result, the following values were obtained as the retention time of pyrene. In the parentheses, a ratio to the value before the test taken as 1 is shown. Before alkali resistance test: 11.0 min (1.00), after passing of 18 hours in alkali resistance test: 9.9 min (0.90).

<Capability Measurement 4: Solvent Exchange Test>

Column B was tested under the same conditions as in Example 1.

As a result, the following values were obtained as the theoretical plate number for each peak. In the parentheses, a value before performing the solvent exchange test and a ratio between before and after the test are shown. Naphthalene: 6,500 (6,900, 0.94), pyrene: 5,000 (5,800, 0.86).

Comparative Example 2

<Step 1: Synthesis of Substrate Particulate Crosslinked Polymer>

A substrate particulate crosslinked polymer (hereinafter, simply referred to as a "substrate gel") was obtained in the same operation as in Example 1.

<Step 2: Thorough Washing>

A thoroughly washed substrate gel was obtained in the same operation as in Example 1.

<Step 3: C18-Introducing Reaction>

In 110 ml of toluene, 20 g of the thoroughly washed substrate gel obtained in step 2 was dispersed. After adding thereto 3.9 g of pyridine, the mixture was subjected to an ultrasonic wave treatment for 3 minutes. Thereto, 6.0 g of stearoyl chloride was added dropwise over 15 minutes while stirring and reacted at 60° C. for 5 hours. Insoluble matters were collected by filtration and washed in sequence with tetrahydrofuran (250 ml), with denatured alcohol (250 ml), with denatured alcohol/water (=1/1) (250 ml), with tetrahydrofuran (250 ml) and with methanol (250 ml) to obtain 35.57 g of a methanol-wetted modified gel.

<Step 4: Capping Treatment>

In 100 ml of 2,2-dimethoxypropane, 35.57 g of the methanol-wetted modified gel obtained in the step 3 was dispersed. After adding thereto 2.0 ml of concentrated hydrochloric acid, the dispersion was subjected to an ultrasonic wave treatment for 3 minutes and then stirred at 50° C. for 2 hours. Insoluble matters were collected by filtration and washed in sequence with methanol (250 ml), with methanol/water (=1/1) (250 ml) and with methanol (250 ml). Then, the gel was air-dried and further dried under reduced pressure at 60° C. for 24 hours to obtain a capping-treated modified gel (21.03 g).

<Introduction Ratio of Octadecanoyl Group>

From respective elementary analysis values of the substrate gel and the modified gel, the introduction ratio of C18 group based on all hydroxyl groups in the substrate gel was calculated and found to be 14 mass %.

<Packing of Modified Gel>

The packing was performed by the same operation as in Example 1 (hereinafter referred to as "Column C").

<Capability Measurement 1: Ratio of Theoretical Plate Numbers of Naphthalene and Pyrene>

Column C was tested under the same conditions as in Example 1.

As a result, the following values were obtained as the theoretical plate number for each peak. In the parentheses, a ratio to the value of naphthalene taken as 1 is shown. Naphthalene: 15,100 (1.00), pyrene: 12,100 (0.80).

<Capability Measurement 2: Acid Resistance Test>

Column C was tested under the same conditions as in Example 1.

As a result, the following values were obtained as the retention time of p-hydroxybenzoic acid. In the parentheses, a ratio to the retention time of p-hydroxybenzoic acid immediately after the initiation, taken as 1, is shown. Immediately after initiation of test: 11.9 min (1.00), after 70 hours from the initiation of test: 7.1 min (0.60).

<Capability Measurement 3: Alkali Resistance Test>

Column C was tested under the same conditions as in Example 1.

As a result, the following values were obtained as the retention time of pyrene. In the parentheses, a ratio to the value before the test taken as 1 is shown. Before alkali resistance test: 11.0 min (1.00), after passing of 18 hours in alkali resistance test: 6.4 min (0.58).

<Capability Measurement 4: Solvent Exchange Test>

Column C was tested under the same conditions as in Example 1.

As a result, the following values were obtained as the theoretical plate number for each peak. In the parentheses, a value before performing the solvent exchange test and a ratio of plate numbers before and after the test are shown. Naphthalene: 11,500 (15,100, 0.76), pyrene: 6,200 (12,100, 0.51).

Comparative Example 3

The synthesis was performed in the same manner as in Example 1 except for omitting step 3. As a result, 17.1 g of a modified gel not subjected to a surface-crosslinking treatment was obtained. In step 4, 15 g of the thoroughly washed substrate gel obtained in step 2 was used as the material.

<Introduction Ratio of C18 Group>

From respective elementary analysis values of the substrate gel not subjected to a surface-crosslinking treatment and the modified gel, the introduction ratio of C18 group was calculated and found to be 17 mass %.

<Packing of Modified Gel>

The packing was performed by the same operation as in Example 1 (hereinafter referred to as "Column D").

<Capability Measurement 1: Ratio of Theoretical Plate Numbers of Naphthalene and Pyrene>

Column D was tested under the same conditions as in Example 1.

As a result, the following values were obtained as the theoretical plate number for each peak. In the parentheses, a ratio to the value of naphthalene taken as 1 is shown. Naphthalene: 6,900 (1.00), pyrene: 5,500 (0.80).

<Capability Measurement 2: Acid Resistance Test>

Column D was tested under the same conditions as in Example 1.

As a result, the following values were obtained as the retention time of p-hydroxybenzoic acid. In the parentheses, a ratio to the retention time of p-hydroxybenzoic acid immediately after the initiation, taken as 1, is shown. Immediately after initiation of test: 10.6 min (1.00), after 70 hours from initiation of test: 8.5 min (0.80).

<Capability Measurement 3: Alkali Resistance Test>

Column D was tested under the same conditions as in Example 1.

As a result, the following values were obtained as the retention time of pyrene. In the parentheses, a ratio to the value before the test taken as 1 is shown. Before alkali resistance test: 9.5 min (1.00), after passing of 18 hours in alkali resistance test: 6.9 min (0.69).

<Capability Measurement 4: Solvent Exchange Test>

Column D was tested under the same conditions as in Example 1.

As a result, the following values were obtained as the theoretical plate number for each peak. In the parentheses, a value before performing the solvent exchange test and a ratio of the plate numbers before and after the test are shown. Naphthalene: 11,500 (15,100, 0.76), pyrene: 5,100 (6,900, 0.74).

Various evaluation results obtained in Examples 1 and 2 and Comparative Examples 1 to 3 are shown together in Table 1.

TABLE 1

|  | Ratio of Plate Numbers of Naphthalene and Pyrene: pyrene/naphthalene | Acid Resistance Test: ratio of retention times of p-hydroxybenzoic acid before and after test | Alkali Resistance Test: ratio of retention times of pyrene before and after test | Solvent Exchange Test: ratio of plate numbers before and after test (upper: naphthalene, lower: pyrene) |
|---|---|---|---|---|
| Column A (Example 1) | 0.85 | 0.98 | 1.00 | 0.99 1.00 |
| Column B (Comparative Example 1) | 0.84 | 0.95 | 0.90 | 0.94 0.86 |
| Column C (Comparative Example 2) | 0.80 | 0.60 | 0.58 | 0.76 0.51 |
| Column D (Comparative Example 3) | 0.80 | 0.80 | 0.69 | 0.76 0.74 |

In Column A obtained in Example 1, the ratio of plate numbers of naphthalene and pyrene is high and the retention after the acid/alkali resistance test is not reduced. Furthermore, even if the solvent exchange is performed between pure water and methanol, the swelling and shrinkage peculiar to a polymer-type packing material is suppressed and the theoretical plate number is not reduced.

It is seen that Column B packed with a modified gel obtained by performing a surface-crosslinking reaction under alkali conditions is reduced in the acid/alkali resistance as compared with Column A and the resistance against solvent exchange is not satisfactorily high.

INDUSTRIAL APPLICABILITY

According to the production process for a packing material for reversed-phase liquid chromatography of the present invention, a high-performance packing material for reversed-phase liquid chromatography can be produced. The column for reversed-phase liquid chromatography, packed with the packing material for reversed-phase liquid chromatography of the present invention can be used in both the very low pH region and the very high pH region.

When the analysis method by reversed-phase liquid chromatography of the present invention is used, high-precision separation/analysis can be attained particularly for medical/agricultural preparations, food additives and intermediates thereof, natural or synthetic polymers and additives therefor, and environmental pollutants. Thus, the present invention is useful in the field over a wide range.

The invention claimed is:

1. A particulate hydrophobic polymer produced by reacting (A) a particulate crosslinked polymer having hydroxyl groups with (B) a crosslinkable epoxy compound containing two or more oxirane rings, hydrolyzing the oxirane rings, and then reacting the obtained compound having hydroxyl groups with (C) an epoxy compound having from 6 to 40 carbon atoms in total, wherein the reaction between the particulate crosslinked polymer (A) having hydroxyl groups and the epoxy compound containing two or more oxirane rings is performed in the presence of a Lewis acid in a low polar solvent.

2. The particulate hydrophobic polymer as claimed in claim 1, wherein the particulate crosslinked polymer (A) having hydroxyl groups is a copolymer of two or more members selected from the group consisting of (I) a poly(meth)acrylate of a polyhydric alcohol, having at least one hydroxyl group within the molecule, (II) a glycidyl (meth)acrylate and (III) a poly(meth)acrylate of a polyhydric alcohol, having no hydroxyl group within the molecule, or a homopolymer of the poly(meth)acrylate of a polyhydric alcohol (I).

3. The particulate hydrophobic polymer as claimed in claim 2, wherein the poly(meth)acrylate of a polyhydric alcohol having at least one hydroxyl group within the molecule (I) is glycerol dimethacrylate, the glycidyl (meth)acrylate (II) is glycidyl methacrylate and the poly(meth)acrylate of a polyhydric alcohol having no hydroxyl group within the molecule (III) is alkylene glycol dimethacrylate.

4. The particulate hydrophobic polymer as claimed in claim 3, wherein the alkylene glycol dimethacrylate is ethylene glycol dimethacrylate.

5. The particulate hydrophobic polymer as claimed in claim 1, wherein the epoxy compound containing two or more oxirane rings is ethylene glycol diglycidyl ether, propylene glycol diglycidyl ether, butylene glycol diglycidyl ether, trimethylolpropane diglycidyl ether, trimethylolpropane triglycidyl ether, pentaerythritol triglycidyl ether or triglycidyl isocyanurate.

6. The particulate hydrophobic polymer as claimed in claim 1, wherein the epoxy compound (C) having from 6 to 40 carbon atoms in total is a compound selected from the group consisting of the compounds represented by the following formulae (1) to (4):

(wherein n represents an integer of 4 to 38);

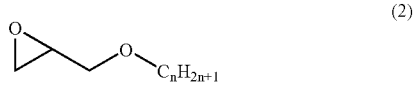

(wherein n represents an integer of 3 to 37);

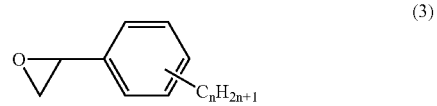

(wherein n represents an integer of 0 to 32);

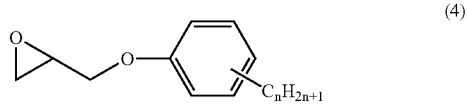

(wherein n represents an integer of 4 to 38);

(wherein n represents an integer of 3 to 37);

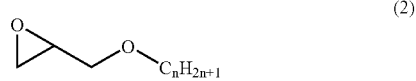

(wherein n represents an integer of 0 to 32);

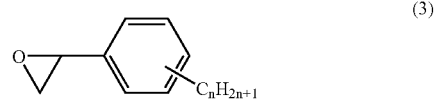

(wherein n represents an integer of 0 to 31).

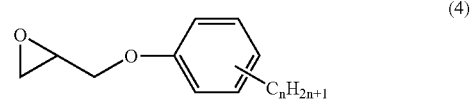

(wherein n represents an integer of 0 to 31).

7. The particulate hydrophobic polymer as claimed in claim 6, wherein the epoxy compound (C) having from 6 to 40 carbon atoms in total is stearyl glycidyl ether.

8. The particulate hydrophobic polymer as claimed in any one of claims 1 to 4 and 5 to 7, wherein the average particle size is from 1 to 2,000 μm.

9. A production process for a particulate hydrophobic polymer, comprising reacting (A) a particulate crosslinked polymer having hydroxyl groups with (B) a crosslinkable epoxy compound containing two or more oxirane rings, hydrolyzing the oxirane rings and then reacting therewith (C) an epoxy compound having from 6 to 40 carbon atoms in total, wherein the reaction between the particulate crosslinked polymer (A) having hydroxyl groups and the epoxy compound containing two or more oxirane rings is performed in the presence of a Lewis acid in a low polar solvent.

10. The production process for a particulate hydrophobic polymer as claimed in claim 9, wherein the particulate crosslinked polymer (A) having a hydroxyl groups is a copolymer of two or more members selected from (I) a poly(meth)acrylate of a polyhydric alcohol, having at least one hydroxyl group within the molecule, (II) a glycidyl (meth)acrylate and (III) a poly(meth)acrylate of a polyhydric alcohol, having no hydroxyl group within the molecule, or a homopolymer of the poly(meth)acrylate of a polyhydric alcohol (I).

11. The production process for a particulate hydrophobic polymer as claimed in claim 10, wherein the poly(meth)acrylate of a polyhydric alcohol having at least a hydroxyl group within the molecule (I) is glycerol dimethacrylate, the glycidyl(meth)acrylate (II) is glycidyl methacrylate and the poly(meth)acrylate of a polyhydric alcohol having no hydroxyl group within the molecule (III) is alkylene glycol dimethacrylate.

12. The production process for a particulate hydrophobic polymer as claimed in claim 11, wherein the alkylene glycol dimethacrylate is ethylene glycol dimethacrylate.

13. The production process for a particulate hydrophobic polymer as claimed in claim 9, wherein the epoxy compound containing two or more oxirane rings is ethylene glycol diglycidyl ether, propylene glycol diglycidyl ether, butylene glycol diglycidyl ether, trimethylolpropane diglycidyl ether, trimethylolpropane triglycidyl ether, pentaerythritol triglycidyl ether or triglycidyl isocyanurate.

14. The production process for a particulate hydrophobic polymer as claimed in claim 9, wherein the epoxy compound (C) having from 6 to 40 carbon atoms in total is a compound selected from the compounds represented by the following formulae (1) to (4):

15. The production process for a particulate hydrophobic polymer as claimed in claim 14, wherein the epoxy compound (C) having from 6 to 40 carbon atoms in total is stearyl glycidyl ether.

16. The production process for a particulate hydrophobic polymer as claimed in claim 9, wherein the low polar solvent is a hydrocarbon having from 5 to 10 carbon atoms in total.

17. The production process for a particulate hydrophobic polymer as claimed in claim 9, wherein the concentration of the Lewis acid is from 1 to 70 mass % based on the particulate crosslinked polymer.

18. The production process for a particulate hydrophobic polymer as claimed in claim 9, wherein the average particle size of the particulate hydrophobic polymer is from 1 to 2,000 μm.

19. A column for reversed-phase liquid chromatography, packed with the particulate hydrophobic polymer as claimed in claim 1.

20. A method for analyzing a sample containing a polycyclic aromatic compound, comprising using the column for reversed-phase liquid chromatography as claimed in claim 19.

* * * * *